US012729701B2

(12) United States Patent
Imlauer et al.

(10) Patent No.: US 12,729,701 B2
(45) Date of Patent: Sep. 8, 2026

(54) HYDRAULIC SYSTEM WITH COOLING CIRCUIT AND MACHINE TOOL

(71) Applicant: HAWE Hydraulik SE, Aschheim (DE)

(72) Inventors: Markus Imlauer, Aschheim (DE); Thomas Wechsel, Aschheim (DE); Korbinian Nagele, Aschheim (DE); Markus Ruhland, Aschheim (DE)

(73) Assignee: HAWE Hydraulik SE, Aschheim (DE)

( * ) Notice: Subject to any disclaimer, the term of this patent is extended or adjusted under 35 U.S.C. 154(b) by 0 days.

(21) Appl. No.: 19/219,362

(22) Filed: May 27, 2025

(65) Prior Publication Data

US 2025/0361891 A1 Nov. 27, 2025

(30) Foreign Application Priority Data

May 27, 2024 (DE) ..................... 10 2024 204 879.8

(51) Int. Cl.
*F15B 21/042* (2019.01)
*F15B 21/0423* (2019.01)

(52) U.S. Cl.
CPC ........ *F15B 21/042* (2013.01); *F15B 21/0423* (2019.01); *F15B 2211/611* (2013.01); *F15B 2211/62* (2013.01)

(58) Field of Classification Search
CPC ................ F15B 21/042; F15B 21/0423; F15B 2211/611; F15B 2211/62
See application file for complete search history.

(56) References Cited

U.S. PATENT DOCUMENTS

| | | | | |
|---|---|---|---|---|
| 4,184,331 A * | 1/1980 | Bentley | F15B 11/17 60/486 |
| 4,738,101 A * | 4/1988 | Kubik | F15B 11/036 60/413 |
| 2010/0322791 A1* | 12/2010 | Wadsley | F04B 23/06 417/302 |
| 2011/0030364 A1* | 2/2011 | Persson | F15B 21/08 60/486 |
| 2022/0186753 A1* | 6/2022 | Reitemann | F15B 21/0423 |

FOREIGN PATENT DOCUMENTS

| | | | |
|---|---|---|---|
| DE | 102023101659 A1 | 7/2024 | |
| WO | WO-2024103489 A1 * | 5/2024 | B63B 39/06 |

* cited by examiner

*Primary Examiner* — Matthew Wiblin
(74) *Attorney, Agent, or Firm* — DINSMORE & SHOHL LLP

(57) ABSTRACT

A hydraulic system is provided for supplying at least one hydraulic consumer with at least one supply pump, a consumer connection, a return connection, a cooling circuit and a tank. The at least one cooling circuit comprises a cooling pump, a circulation cooling line connected to the tank and a heat exchanger. The cooling pump and the heat exchanger are disposed in the circulation cooling line. Downstream of the cooling pump and upstream of the heat exchanger, a branch line connected to the consumer connection branches off from the circulation cooling line and the cooling circuit comprises a switching valve. The switching valve can be switched between a closed position and an open position, wherein the circulation cooling line is closed in the closed position, so that the cooling pump is only connected to the branch line. In the open position, the cooling pump is connected to the heat exchanger.

11 Claims, 3 Drawing Sheets

HYDRAULIC SYSTEM WITH COOLING CIRCUIT AND MACHINE TOOL

CROSS REFERENCE TO RELATED APPLICATION

This application claims the priority benefit from German Patent Application No. 10 2024 204 879.8, filed on May 27, 2024, the entire contents of which is incorporated herein by reference in its entirety.

FIELD

The present disclosure relates to a hydraulic system with at least one cooling circuit and to a machine tool with such a hydraulic system.

BACKGROUND

Such hydraulic systems with a cooling circuit are known in the state of the art. These hydraulic systems regularly have at least one supply pump, a tank, a consumer connection and a return connection. A hydraulic consumer is connected to the consumer connection and to the return connection and can thus be pressurized via the supply pump.

When used in a machine tool in particular, the hydraulic system must fulfill a wide range of conditions. On the one hand, a constant volume flow at a largely constant system pressure is regularly required, for example to maintain the clamping pressure of a hydraulically actuated clamping device for fixing the workpiece. For example, a volume flow of approx. 2 l/min to 6 l/min at a constant system pressure of 100 bar must be guaranteed. Another requirement is that the temperature of the hydraulic fluid is kept within a specified range, for example from 20° C. to 40° C. For this purpose, the hydraulic system regularly has a separate cooling circuit as off-line cooling with a cooling pump, a circulation cooling line and a heat exchanger.

Furthermore, during operation of the machine tool, a different peak volume flow may also be required due to additional functionalities, for example during a hydraulically controlled tool change. These dynamic additional volume flows must not lead to a critical pressure drop in the pressure supply of the other components of the machine tool, in particular not to a drop in the pressure supply of the clamping device.

It is known from the state of the art to provide these dynamic additional volume flows via hydraulic accumulators and a corresponding accumulator charging circuit. The disadvantage of such hydraulic accumulators is that they require regular maintenance and therefore increase the operating costs of the machine tool, especially if the hydraulic accumulators are completely emptied during operation. Furthermore, the accumulator charging circuit also increases the complexity and therefore the cost of the hydraulic system. An alternative is to drive the supply pump via an asynchronous motor with a frequency converter. However, this also increases the cost of the hydraulic system and, depending on the field of application, it may still be necessary to use a hydraulic accumulator, albeit a somewhat smaller one.

SUMMARY

A hydraulic system is provided for supplying at least one hydraulic consumer with at least one supply pump, a consumer connection, a return connection, at least one cooling circuit and a tank. In one embodiment, the supply pump is connected to the tank and the consumer connection. The return connection is connected to the tank. The at least one cooling circuit comprises a cooling pump, a circulation cooling line connected to the tank and a heat exchanger. The cooling pump and the heat exchanger are disposed in the circulation cooling line. A branch line connected to the consumer connection branches off from the circulation cooling line downstream of the cooling pump and upstream of the heat exchanger. The cooling circuit comprises a first switching valve which can be switched between a closed position and an open position. The circulation cooling line is closed in the closed position of the first switching valve, so that the cooling pump is only connected to the branch line in the closed position of the first switching valve, and the cooling pump is connected to the heat exchanger in the open position of the first switching valve.

In one embodiment, a non-return valve opening in the direction of flow to the consumer connection is disposed in the branch line.

In another embodiment, the first switching valve is preloaded into the closed position and the hydraulic system comprises a first control line connected to the consumer connection, where the pressure in the first control line is applied to the first switching valve on the opening side.

In one embodiment, the hydraulic system comprises a control unit and the first switching valve is an electromagnetically controlled switching valve. The control unit controls the first switching valve on the basis of at least one determined parameter of the hydraulic system, where the first switching valve is preloaded into the closed position.

In one embodiment, the at least one supply pump is a variable displacement pump. The at least one supply pump comprises a displacement device. An adjusting line connected to the displacement device branches off from the circulation cooling line between the first switching valve and the heat exchanger. A bypass line connects the displacement device to the tank. A second switching valve is disposed in the displacement line and can be switched between an open position and a closed position. The displacement line is open in the open position of the second switching valve and is closed in the closed position of the second switching valve.

In one embodiment, the second switching valve is preloaded into the closed position. The hydraulic system comprises a second control line connected to the consumer connection. The pressure in the second control line is applied to the second switching valve on the opening side. The hydraulic system comprises a control unit and the second switching valve is an electromagnetically controlled switching valve, where the control unit controls the second switching valve on the basis of at least one determined parameter of the hydraulic system and the second switching valve is preferably preloaded into the closed position.

In one embodiment, the at least one supply pump is a directly electrically variable displacement pump.

In one embodiment, the cooling pump is a gear pump and the at least one supply pump is a radial piston pump.

In one embodiment, the hydraulic system comprises a plurality of supply pumps and each supply pump is connected to the tank and the consumer connection.

In the present disclosure, a machine tool is also provided with at least one hydraulic consumer and a hydraulic system according to the embodiments disclosed herein, where the hydraulic consumer is connected to the consumer connection and the return connection.

DETAILED DESCRIPTION

Figure 1:
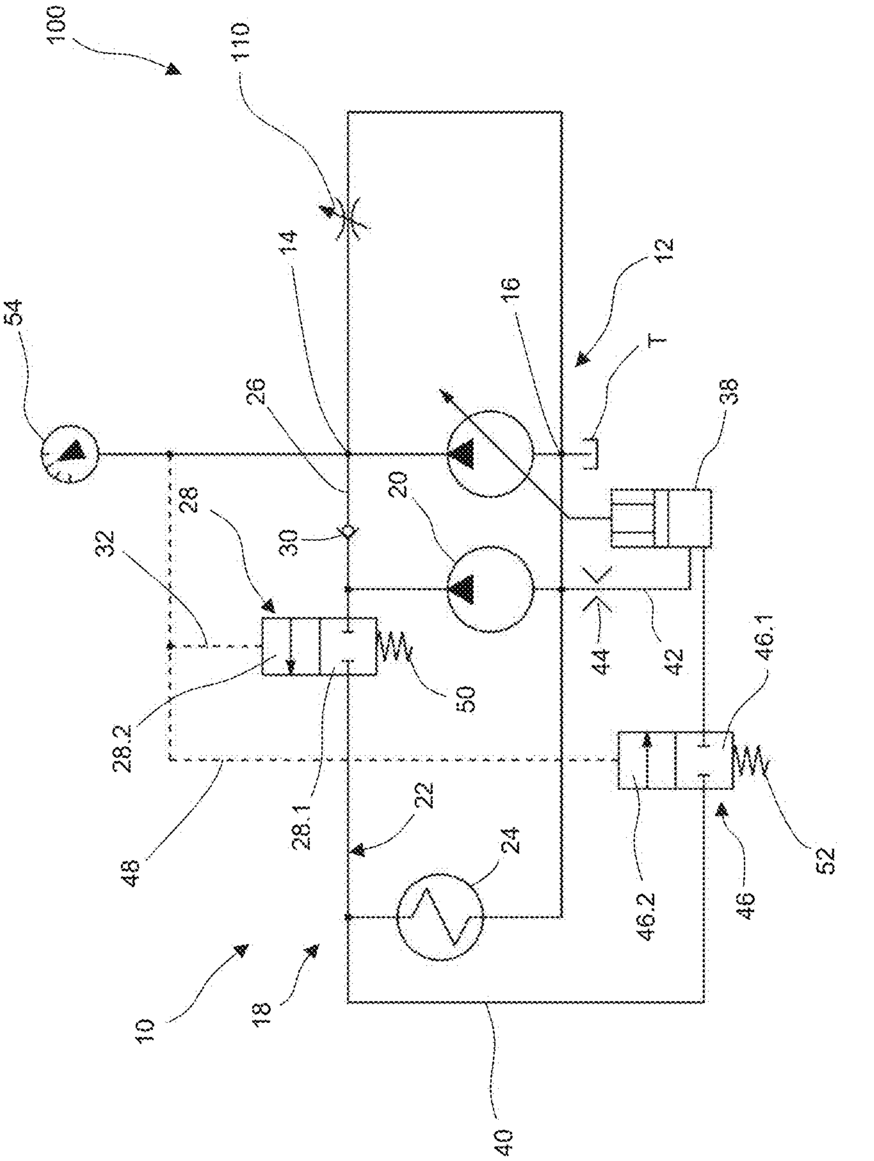
FIG. 1 depicts a hydraulic circuit diagram of a machine tool with a hydraulic system according to a first embodiment.

It is the objective of the present disclosure to provide a hydraulic system for supplying at least one hydraulic consumer, which fulfills the requirements in use and is simple in design and cost-effective.

The solution to the problem is achieved with a hydraulic system and a machine tool according to the embodiments disclosed herein.

The hydraulic system according to the disclosure for supplying at least one hydraulic consumer comprises at least one supply pump, a consumer connection, a return connection, at least one cooling circuit and a tank. The at least one supply pump is connected to the tank and the consumer connection, so that the consumer connection or a hydraulic consumer connected to the consumer connection can be pressurized via the at least one supply pump. The return connection is connected to the tank. The at least one cooling circuit comprises a cooling pump, a circulation cooling line connected to the tank and a heat exchanger. The hydraulic system according to the disclosure is characterized over the prior art in that a branch line connected to the consumer connection branches off from the circulation cooling line downstream of the cooling pump and upstream of the heat exchanger. Furthermore, according to the present disclosure, the cooling circuit has a first switching valve that can be switched between a closed position and an open position. The circulation cooling line is closed in the closed position of the first switching valve, so that the cooling pump is only connected to the branch line in the closed position of the first switching valve. In the open position of the first switching valve, the cooling pump is also connected to the heat exchanger.

In other words, the cooling circuit can be deactivated by switching the first switching valve so that the cooling pump is no longer connected to the heat exchanger, but only to the branch line branching off from the circulation cooling line and therefore to the consumer connection. A temperature increase in the hydraulic fluid caused by deactivating the cooling circuit is negligible, as the cooling circuit is only deactivated briefly via the first switching valve and only to cover the dynamic additional volume flows. This means that the cooling pump can be used briefly to prevent a pressure drop in the system pressure due to a required peak volume flow without causing an excessive increase in the temperature of the hydraulic fluid. This provides a particularly cost-efficient hydraulic system.

In some aspects, a non-return valve opening in the direction of flow to the consumer connection is disposed in the branch line. This prevents hydraulic fluid pumped by the supply pump from entering the circulation cooling line. Alternatively or additionally, it is also conceivable to configure the first switching valve as a 3/2-way valve and not to provide a non-return valve in the branch line, so that the cooling pump is connected either to the heat exchanger or to the branch line, depending on the switching position of the first switching valve.

In some aspects, the first switching valve is preloaded into the closed position, for example via a spring. The hydraulic system preferably comprises a first control line connected to the consumer connection, whereby the pressure in the first control line is applied to the first switching valve on the opening side. The system pressure present at the consumer connection is therefore reported to the first switching valve via the first control line, so that this is switched to the open position when the pressure exceeds the preload force. If there is a pressure drop in the system pressure, the first switching valve switches to the closed position due to the preload, so that the cooling pump is only connected to the consumer connection via the branch line and therefore ensures a constant system pressure.

Alternatively, the hydraulic system may comprise a control unit, whereby the first switching valve is an electromagnetically controlled switching valve. The control unit controls the first switching valve using at least one determined parameter of the hydraulic system. The parameter can, for example, be a pressure determined via a sensor or a volume flow. For this purpose, the hydraulic system preferably comprises at least one sensor, in particular a pressure sensor and/or a volume flow sensor, which is connected to the control unit. The first switching valve can be preloaded into the closed position, for example via a spring. Alternatively, the first switching valve can also be a switching valve that can be actuated electromagnetically on both sides, which is actuated accordingly via the control system using the at least one determined parameter of the hydraulic system.

In some aspects, the at least one supply pump is an variable displacement pump. A variable displacement pump is preferable from an energy point of view.

In some aspects, the at least one supply pump comprises a displacement device, whereby displacement line connected to the displacement device branches off from the circulation cooling line between the first switching valve and the heat exchanger, and a bypass line connects the displacement device to the tank. A hydraulic resistor, for example an orifice or a nozzle, is preferably arranged in the bypass line. The displacement device is preferably configured as a displacement cylinder.

In this context, it is preferable if a second switching valve is arranged in the displacement line. The second switching valve can be switched between an open position and a closed position, whereby the displacement line is open in the open position of the second switching valve and closed in the closed position of the second switching valve. The second switching valve can be designed as a proportional switching valve or a binary-acting switching valve. The second switching valve can be used for highly dynamic pressure control.

In some aspects, the second switching valve is preloaded into the closed position, for example via a spring. The hydraulic system preferably has a second control line connected to the consumer connection, whereby the pressure in the second control line is applied to the second switching valve on the opening side. This enables particularly simple but efficient pressure control of the supply pump. If there is a pressure drop in the system pressure, the second switching valve is switched to the closed position and the pressure at the displacement device is reduced via the bypass line so that the supply pump is controlled to maximum output. At the same time, the cooling pump is only connected to the branch line by switching the first switching valve, so that a stable system pressure is restored.

Alternatively, the second switching valve can be an electromagnetically controlled switching valve, which is controlled via the control system of the hydraulic system using at least one determined parameter of the hydraulic system. As already explained above, the at least one parameter of the hydraulic system can be a pressure or a volume flow, for example, and can be reported to the control system via at least one sensor of the hydraulic system. It is conceivable that the second switching valve is preloaded into the closed position, for example via a spring, or is a switching valve that can be controlled electromagnetically on both sides.

In an alternative embodiment, the at least one supply pump can be configured as a directly electrically variable displacement pump. This has the advantage that the second switching valve and the displacement device can be omitted. In this case, it is preferable if the directly electrically variable displacement pump is controlled via the control system of the hydraulic system using a determined parameter of the hydraulic system. As already explained above, it is useful in this context if the hydraulic system comprises at least one corresponding sensor, for example a pressure sensor, a volume flow sensor or a combined pressure and volume flow sensor.

In some aspects, the cooling pump is a gear pump. A gear pump is inexpensive, easy to maintain and robust. It is also preferable if the at least one supply pump is a radial piston pump. In particular, it is useful if the radial piston pump is made up of a plurality of pump elements so that individual pump elements can be switched on and off to adjust the pump.

Furthermore, it is preferable if the hydraulic system comprises a plurality of supply pumps, whereby each supply pump is connected to the tank and the respective consumer connection. Depending on the configuration of the respective supply pump, corresponding displacement lines with switching valves, bypass lines or displacement devices disposed therein are therefore provided. It can be preferable that a supply pump is provided for each hydraulic consumer to be controlled.

Furthermore, the hydraulic system can also comprise a plurality of cooling circuits, with each cooling circuit preferably being assigned to a supply pump. In this way, an additional dynamic volume flow can be provided for each supply pump circuit by the respective cooling pump by deactivating the respective cooling circuit.

Furthermore, the solution to the problem is achieved with a machine tool that comprises at least one hydraulic consumer and a hydraulic system as described above. The hydraulic consumer is connected to the consumer connection and the return connection of the hydraulic system. The machine tool can be, for example, a lathe, a milling machine, a machining center, a hollowing machine or a drilling machine.

FIG. 1 depicts a hydraulic circuit diagram of a machine tool 100 with a hydraulic consumer 110, which is only indicated schematically in FIG. 1. The machine tool 100 can be a lathe, for example. The hydraulic consumer 110 can, for example, be a hydraulically actuated clamping device for a workpiece. The machine tool 100 also comprises a hydraulic system 10.

As shown, the hydraulic system 10 comprises a supply pump 12, a tank T, a consumer connection 14, a return connection 16 and a cooling circuit 18. The hydraulic consumer 110 is connected to the consumer connection 14 and the return connection 16. The supply pump 12 is connected to the tank T and the consumer connection 14, so that the hydraulic consumer 110 can be supplied with pressurized hydraulic fluid via the supply pump 12.

In order to keep the hydraulic fluid within a predetermined temperature range of, for example, 20° C. to 40° C., the cooling circuit 18 comprises a cooling pump 20, a circulation cooling line 22 and a heat exchanger 24. As shown in FIG. 1, the cooling pump 20 and the heat exchanger 24 are disposed in the circulation cooling line 22. Furthermore, the circulation cooling line 22 is connected to the tank T, so that the cooling pump 20 pumps heated hydraulic fluid via the heat exchanger 24, where it is cooled and then returned to the tank T. In this exemplary embodiment, the cooling pump 20 is configured as a gear pump.

Between the cooling pump 20 and the heat exchanger 24, a branch line 26 branches off from the circulation cooling line 22. In other words, the branch line 26 branches off from the circulation cooling line 22 upstream of the cooling pump 20 and downstream of the heat exchanger 24. As shown in FIG. 1, the branch line 26 opens upstream of the supply pump 12 and is thus connected to the consumer connection 14. A non-return valve 30, which opens in the direction of flow to the consumer connection 14, is disposed in the branch line 26 and prevents unwanted backflow via the branch line 26 to the heat exchanger 24.

A first switching valve 28 is disposed between the cooling pump 20 and the heat exchanger 24 in the circulation cooling line 22. In this exemplary embodiment, the first switching valve 28 is configured as a 2/2-way valve. In a closed position 28.1 of the first switching valve 28, the circulation cooling line 22 is closed, so that the cooling pump 20 is no longer connected to the heat exchanger 24, but only to the branch line 26. In an open position 28.2 of the first switching valve 28, the circulation cooling line 22 is open and the cooling circuit 18 is thus activated, in that hydraulic fluid can be supplied to the heat exchanger 24 via the cooling pump 20.

In this exemplary embodiment, the first switching valve 28 is preloaded into the closed position 28.1 via a spring 50. Furthermore, the first switching valve 28 can be pressurized via a first control line 32 on the opening side and thus against the force of the spring 50. The first control line 32 is connected to the consumer connection 14, whereby the system pressure present at the consumer connection 14 is reported to the first switching valve 28 via the first control line 32. As shown, a pressure gauge 54 may also be provided to indicate the system pressure present at the consumer connection 14. It is conceivable that the first switching valve 28 and the non-return valve 30 are formed by a combined valve, for example by a 3/2-way valve.

In this exemplary embodiment, the supply pump 12 is configured as an variable displacement radial piston pump. Preferably, the supply pump 12 comprises a plurality of pump elements that can be switched on and off as required. In order to adjust the delivery rate of the supply pump 12, the supply pump 12 comprises a displacement device 38 and a bypass line 42 connecting the displacement device 38 to the tank T. In this exemplary embodiment, the displacement device 38 is configured as a displacement cylinder. A nozzle 44 is disposed in the bypass line 42, via which the displacement device 38 is relieved to the tank T.

A displacement line 40 branches off between the first switching valve 28 and the heat exchanger 24. The displacement line 40 is connected to the displacement device 38. A second switching valve 46 is disposed in the displacement line 40, which can be switched between a closed position 46.1 and an open position 46.2. The second switching valve 46 is preloaded into the closed position 46.1 via a spring 52. On the opening side, the system pressure present at the supply connection 14 is reported to the second switching valve 46 via a second control line 48. In this exemplary embodiment, the second switching valve 46 is configured as a 2/2-way valve. The second switching valve 46 can also be provided as a proportional valve. The second switching valve 46 is thus configured to dynamically control the displacement device 38 depending on the system pressure applied to the consumer connection 14.

The function of the hydraulic system 10 according to the present disclosure and shown in FIG. 1 is now explained below.

During normal operation of the hydraulic system 10, a constant system pressure of, for example, 100 bar at a flow rate of, for example, 2 l/min to 6 l/min is present at the consumer connection 14 in order to maintain the necessary pressure at the hydraulic consumer 110 (e.g. a clamping pressure). The system pressure is reported via the first control line 32 on the opening side to the first switching valve 28, so that this is switched to the open position 28.2 against the force of the spring 50. The cooling circuit 18 is activated because the cooling pump 20 pumps hydraulic fluid to the heat exchanger 24 via the first switching valve 28, which is switched to the open position 28.2. The system pressure is applied to the second switching valve 46 via the second control line 48 on the opening side and against the force of the spring 52, whereby the pressure present in the displacement line 40 and thus the delivery rate of the supply pump 12 is controlled via the displacement device 38.

If an additional dynamic volume flow now occurs, for example due to a hydraulically actuated tool change, this can lead to a pressure drop in the system pressure. However, the system pressure must not drop into a critical range in which the necessary clamping pressure at the hydraulic consumer 110 can no longer be maintained. For example, pressure drops of less than 10 bar may be tolerable.

If the system pressure drops more sharply, this greater pressure drop is reported to the first switching valve 28 via the first control line 32 and the spring force of the spring 50 exceeds the pressure reported via the first control line 32. The first switching valve 28 thus switches from the open position 28.2 to the closed position 28.1, whereby the cooling pump 20 is now only connected to the branch line 26. The non-return valve 30 opens and the entire volume flow of the cooling pump 20 is applied at the consumer connection 14.

Furthermore, the pressure drop in the system pressure is reported to the second switching valve 46 via the second control line 48. The spring force of the spring 52 exceeds the pressure reported via the second control line 48 and the second switching valve 46 switches from the open position 46.2 to the closed position 46.1. The displacement device 38 is relieved via the bypass line 42 and the supply pump 12 is thus controlled to the maximum output. The maximum volume flow of both pumps, namely the cooling pump 20 and the supply pump 12, is therefore applied at the supply connection 14.

As soon as the additional dynamic volume flow no longer occurs, the first switching valve 28 is switched back to the open position 28.2 and the cooling circuit 18 is reactivated. Accordingly, the flow rate of the supply pump 12 is also controlled via the second switching valve 46 and the displacement device 38.

Figure 2:
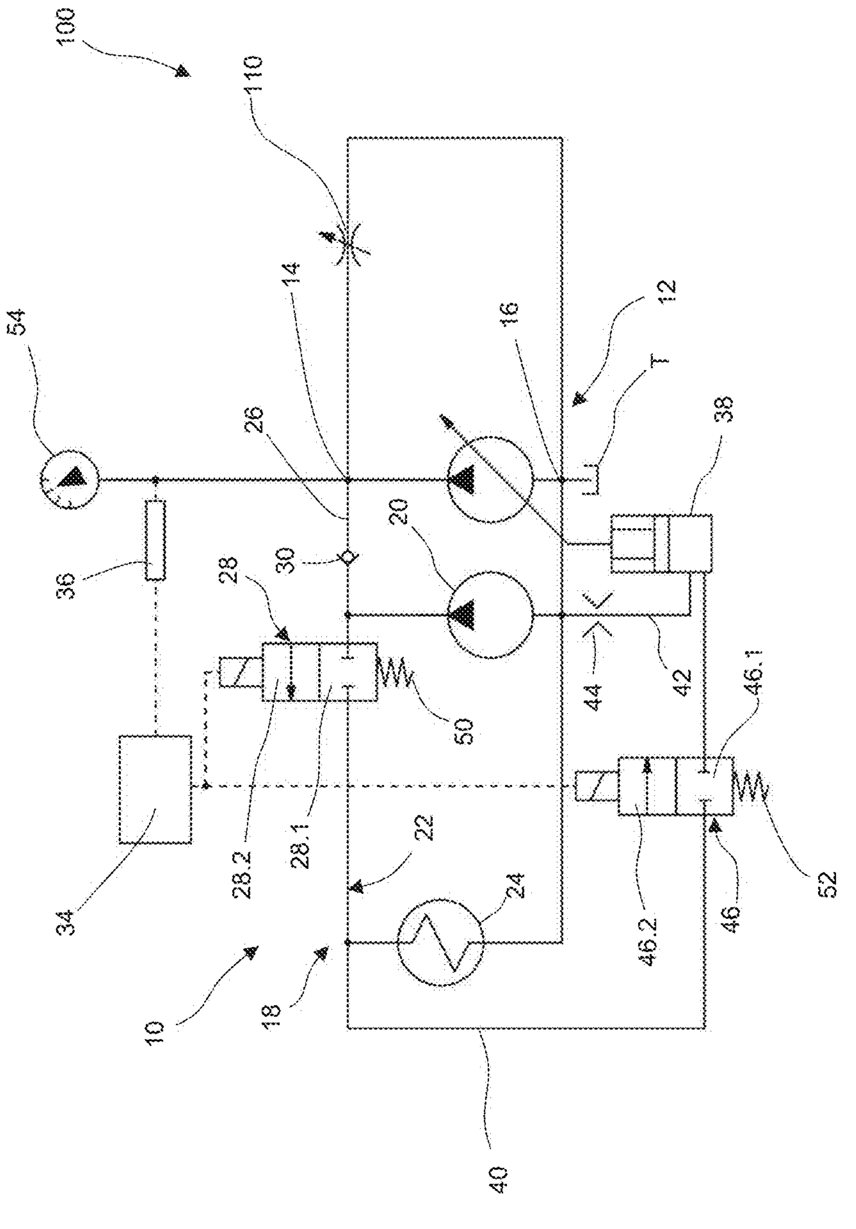
FIG. 2 depicts a hydraulic circuit diagram of a machine tool with a hydraulic system according to a second embodiment.

FIG. 2 shows a hydraulic circuit diagram according to a second embodiment of a machine tool 100 with a hydraulic system 10 according to the present disclosure. Only the differences to the embodiment shown in FIG. 1 are explained below.

The embodiment shown in FIG. 2 differs from the embodiment shown in FIG. 1 in the configuration of the first switching valve 28, the second switching valve 46 and the actuation of these two valves. In this embodiment, no control lines are provided which report the pressure at the supply connection 14 to the first switching valve 28 or the second switching valve 46 on the opening side. The first switching valve 28 in this exemplary embodiment is configured as an electromagnetic 2/2-way valve, whereby the first switching valve 28 is preloaded into the closed position 28.1 via the spring 50. In this exemplary embodiment, the second switching valve 46 is also configured as an electromagnetic 2/2-way valve, which is preloaded into the closed position 46.1 via the spring 52.

The hydraulic system 10 comprises a control unit 34 for energizing the electromagnets of the first switching valve 28 and the second switching valve 46 and thus switching the first switching valve 28 to the open position 28.2 and the second switching valve 46 to the open position 46.2. Furthermore, the hydraulic system 10 comprises a sensor 36 which measures at least one parameter of the hydraulic system 10 and reports it to the control unit 34 for controlling the first switching valve 28 and the second switching valve 46. The sensor 36 can, for example, be a pressure sensor, a volume flow sensor or a combined pressure and volume flow sensor.

If the control unit 34 recognizes an additional dynamic volume flow via the sensor 36, the first switching valve 28 is switched to the closed position 28.1 by de-energizing the magnet. The cooling circuit 18 is deactivated and the cooling pump 20 is only connected to the branch line 26. Accordingly, the second switching valve 46 is switched to the closed position 46.1 by de-energizing the magnet, so that the displacement device 38 is relieved via the bypass line 42 and the supply pump 12 is controlled to maximum output.

As soon as the additional dynamic volume flow no longer occurs, the first switching valve 28 is switched back to the open position 28.2 by energizing the magnet and the cooling circuit 18 is thus reactivated. Accordingly, the flow rate of the supply pump 12 is also controlled by energizing the second switching valve 46 and the displacement device 38.

Figure 3:
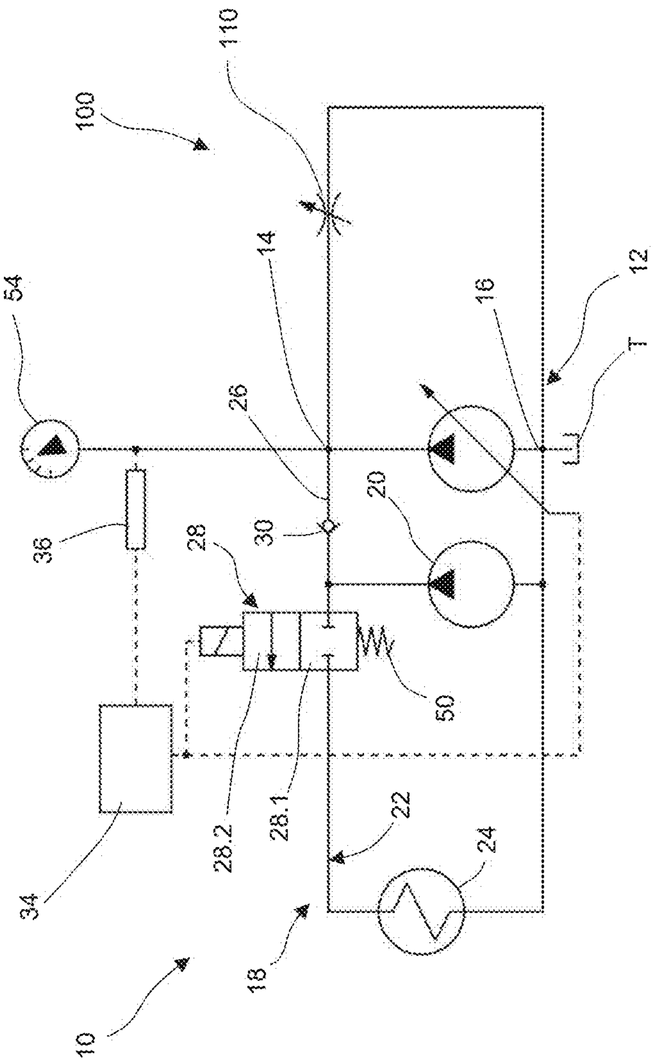
FIG. 3 depicts a hydraulic circuit diagram of a machine tool with a hydraulic system according to a third embodiment.

FIG. 3 shows a hydraulic circuit diagram according to a third embodiment of a machine tool 100 with a hydraulic system 10 according to the present disclosure. Only the differences to the embodiment shown in FIG. 2 are explained below.

The supply pump 12 of the embodiment shown in FIG. 3 is configured as a directly electrically variable displacement pump. In this respect, no second switching valve, no displacement line and no displacement device are provided in this exemplary embodiment. The supply pump is connected directly to the control unit 34 and is controlled on the basis of the parameters measured by the sensor 36 in such a way that the delivery rate is controlled conventionally in normal operation and to maximum output when an additional dynamic volume flow occurs. At the same time, when an additional dynamic volume flow occurs, the first switching valve 28 is switched to the closed position 28.1 via the control unit so that the cooling pump 20 supplies pressure to the hydraulic consumer 110 exclusively via the branch line 26.

As soon as the additional dynamic volume flow no longer occurs, the first switching valve 28 is switched back to the open position 28.2 by energizing the magnet and the cooling circuit 18 is thus reactivated. Accordingly, the flow rate of the supply pump 12 is also controlled via a corresponding direct electrical adjustment.

Furthermore, it is possible in principle to combine the embodiments described above, for example by pressurizing the first switching valve 28 via the respective control line on the opening side, and the second switching valve 46 is an electromagnetic switching valve which is actuated via the control unit 34. It should therefore also be pointed out that the terms used herein, such as “first”, “second” or “third”, do not specify a concrete sequence, but serve exclusively to differentiate the corresponding features.

The invention claimed is:

1. A hydraulic system for supplying at least one hydraulic consumer with at least one supply pump, a consumer connection, a return connection, at least one cooling circuit and a tank, wherein the at least one supply pump is a variable displacement pump and is connected to the tank and the consumer connection, wherein the return connection is connected to the tank, wherein the at least one cooling circuit comprises a cooling pump, a circulation cooling line connected to the tank and a heat exchanger, wherein the cooling pump and the heat exchanger are disposed in the circulation cooling line, wherein a branch line connected to the consumer connection branches off from the circulation cooling line downstream of the cooling pump and upstream of the heat exchanger, wherein the cooling circuit comprises a first switching valve, wherein the first switching valve is switchable between a closed position and an open position, wherein the circulation cooling line is closed in the closed position of the first switching valve, so that the cooling pump is only connected to the branch line in the closed position of the first switching valve, wherein the cooling pump is connected to the heat exchanger in the open position of the first switching valve, and wherein the at least one supply pump comprises a displacement device, and a displacement line connected to the displacement device branches off from the circulation cooling line between the first switching valve and the heat exchanger, and a bypass line connects the displacement device to the tank.

2. The hydraulic system according to claim 1, wherein a non-return valve opening in a direction of flow to the consumer connection is disposed in the branch line.

3. The hydraulic system according to claim 1, wherein the first switching valve is preloaded into the closed position, and the hydraulic system comprises a first control line connected to the consumer connection, wherein a pressure in the first control line is applied to the first switching valve on an opening side.

4. The hydraulic system according to claim 1, wherein the hydraulic system comprises a control unit and the first switching valve is an electromagnetically controlled switching valve, wherein the control unit controls the first switching valve on the basis of at least one determined parameter of the hydraulic system, wherein the first switching valve is preloaded into the closed position.

5. The hydraulic system according to claim 1, wherein a second switching valve is disposed in the displacement line, wherein the second switching valve is switchable between an open position and a closed position, wherein the displacement line is open in the open position of the second switching valve and wherein the displacement line is closed in the closed position of the second switching valve.

6. The hydraulic system according to claim 5, wherein the second switching valve is preloaded into the closed position, and the hydraulic system comprises a second control line connected to the consumer connection, wherein a pressure in the second control line is applied to the second switching valve on an opening side.

7. The hydraulic system according to claim 5, wherein the hydraulic system comprises a control unit and the second switching valve is an electromagnetically controlled switching valve, wherein the control unit controls the second switching valve on the basis of at least one determined parameter of the hydraulic system, wherein the second switching valve is preloaded into the closed position.

8. The hydraulic system according to claim 1, wherein the at least one supply pump is a directly electrically variable displacement pump.

9. The hydraulic system according to claim 1, wherein the cooling pump is a gear pump and the at least one supply pump is a radial piston pump.

10. The hydraulic system according to claim 1, wherein the at least one supply pump is a plurality of supply pumps, each of the plurality of supply pumps being connected to the tank and the consumer connection.

11. A machine tool with the at least one hydraulic consumer and the hydraulic system according to claim 1, wherein the hydraulic consumer is connected to the consumer connection and the return connection.

* * * * *